US012123341B1

(12) United States Patent
Barberger et al.

(10) Patent No.: US 12,123,341 B1
(45) Date of Patent: Oct. 22, 2024

(54) ROTOR ENGINE SIDE HOUSING AND METHOD FOR PRODUCING THE SAME

(71) Applicant: Pratt & Whitney Canada Corp., Longueuil (CA)

(72) Inventors: Jérémie Barberger, Montreal (CA); Michel Bousquet, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/132,187

(22) Filed: Apr. 7, 2023

(51) Int. Cl.
*F02B 55/10* (2006.01)
*F01C 1/22* (2006.01)
*F01C 21/06* (2006.01)
*F04C 18/02* (2006.01)
*F04C 29/04* (2006.01)

(52) U.S. Cl.
CPC .............. *F02B 55/10* (2013.01); *F01C 21/06* (2013.01); *F04C 29/04* (2013.01); *F01C 1/22* (2013.01); *F04C 18/02* (2013.01)

(58) Field of Classification Search
CPC .. F02B 55/10; F01C 21/06; F01C 1/22; F04C 29/04; F04C 18/02
See application file for complete search history.

(56) References Cited

U.S. PATENT DOCUMENTS 3,096,746 A * 7/1963 Sollinger ................ F16C 17/02 418/60
3,234,922 A * 2/1966 Froede .................... F02B 55/12 418/101
3,280,802 A 10/1966 Froede
3,830,598 A * 8/1974 Ruf ......................... F02B 55/16 29/888.012
3,954,356 A 5/1976 Winchell
4,050,132 A * 9/1977 Wieland .................. F02B 55/08 228/175
9,435,204 B2 9/2016 Horn (Continued)

FOREIGN PATENT DOCUMENTS

CS 202039 B2 * 12/1980
DE 102008026920 A1 6/2009

OTHER PUBLICATIONS

English Machine Translation of CS202039B2 translated via USPTO Fit Database (Year: 1980).*

(Continued)

*Primary Examiner* — Dominick L Plakkoottam
*Assistant Examiner* — Paul W Thiede
(74) *Attorney, Agent, or Firm* — Getz Balich LLC

(57) ABSTRACT

A rotary engine side housing is provided that includes a side plate portion, a side housing body portion, a coolant chamber, and a plurality of posts. The side plate portion has exterior and interior surfaces. The coolant chamber is disposed internally within the side housing body portion. The coolant chamber is defined by a chamber base surface, the peripheral side walls, and the side plate portion interior surface. The chamber base surface and the side plate portion interior surface are spaced apart from one another and the one or more peripheral side walls extend there between. The plurality of posts extend between the chamber base surface and the side plate portion interior surface. The side plate portion, the side body housing portion, and the plurality of posts are integrally formed with one another.

20 Claims, 6 Drawing Sheets

(56) References Cited

U.S. PATENT DOCUMENTS

| | | | | |
|---|---|---|---|---|
| 2018/0141127 | A1 | 5/2018 | Richard | |
| 2019/0169999 | A1 * | 6/2019 | Rathay .................. | B33Y 80/00 |
| 2022/0373273 | A1 | 11/2022 | Klausner | |

OTHER PUBLICATIONS

EP Search Report for EP Patent Application 24168988.4 dated Sep. 20, 2024.

* cited by examiner

ROTOR ENGINE SIDE HOUSING AND METHOD FOR PRODUCING THE SAME

BACKGROUND OF THE INVENTION

1. Technical Field

This disclosure relates generally to rotary engines in general, and to rotary engine side housings in particular.

2. Background Information

Engines typically compress air or other gaseous oxidizers prior to adding fuel and ignition to produce power. Many examples of engines with separable positive displacement compression systems exist. One example can be conceptualized from a Wankel engine. The Wankel engine, invented by German engineer Felix Wankel is a type of internal combustion engine which uses a rotary design. Wankel engines are known in the aerospace industry as well as the automotive industry. Wankel engines have a cycle that takes place in a space between the inside of an oval-like epitrochoid-shaped housing and a rotor that is similar in shape to a Reuleaux triangle but with sides that are somewhat flatter. This design delivers smooth high-rpm power from a compact size. Since its introduction, the engine has been commonly referred to as the rotary engine Rotary engine housings suffer from structural inefficiency and non-uniform cooling, resulting in increased weight and reduced engine life as well as relatively complex and expensive castings. Specifically, prior art rotary engines have multiple components requiring multiple seals between such components. For instance, a conventional rotary engine has multiple separate pieces forming the housing—an intermediate housing, a front side housing, and a rear side housing—where the connection between each component requires sealing. There is a need for a structurally efficient liquid cooled housing for a rotary engine.

SUMMARY

According to an aspect of the present disclosure, a rotary engine side housing is provided that includes a side plate portion, a side housing body portion, a coolant chamber, and a plurality of posts. The side plate portion has an exterior surface and an interior surface. The coolant chamber is disposed internally within the side housing body portion. The coolant chamber is defined by a chamber base surface, one or more peripheral side walls, and the side plate portion interior surface. The chamber base surface and the side plate portion interior surface are spaced apart from one another and the one or more peripheral side walls extend between the chamber base surface and the side plate portion interior surface. The plurality of posts extend between the chamber base surface and the side plate portion interior surface. The side plate portion, the side body housing portion, and the plurality of posts are integrally formed with one another.

In any of the aspects or embodiments described above and herein, the plurality of posts may include a first group of posts that extend entirely between the chamber base surface and the side plate portion interior surface and are integrally connected to both the chamber base surface and the side plate portion interior surface.

In any of the aspects or embodiments described above and herein, the plurality of posts may include at least one post that is integrally connected to the chamber base surface and extends outwardly toward the side plate portion interior surface.

In any of the aspects or embodiments described above and herein, the plurality of posts may include at least one post that is integrally connected to the side plate portion interior surface and extends outwardly toward the chamber base surface.

In any of the aspects or embodiments described above and herein, the plurality of posts may include at least one post having a first cross-sectional geometry and at least one post having a second cross-sectional geometry, and the second cross-sectional geometry may be different from the first cross-sectional geometry.

In any of the aspects or embodiments described above and herein, the plurality of posts may include at least one post having a constant cross-sectional geometry in a direction between the chamber base surface and the side plate portion interior surface.

In any of the aspects or embodiments described above and herein, the plurality of posts may include at least one post having a non-constant cross-sectional geometry in a direction between the chamber base surface and the side plate portion interior surface.

In any of the aspects or embodiments described above and herein, the plurality of posts may each have a length over diameter (L/D) between 0.25 to 25.

In any of the aspects or embodiments described above and herein, the plurality of posts may include at least one post having a cross-sectional geometry configured to direct fluid flow within the coolant chamber.

In any of the aspects or embodiments described above and herein, the side plate portion, the side housing body portion, and the plurality of posts may comprise the same material.

In any of the aspects or embodiments described above and herein, the side housing may be configured as a front side housing.

According to another aspect of the present disclosure, a rotary engine is provided that includes an intermediate housing and a pair of side housings. Each side housing includes a side plate portion, a side housing body portion, a coolant chamber, and a plurality of posts. The side plate portion has an exterior surface and an interior surface. The coolant chamber is disposed internally within the side housing body portion. The coolant chamber is defined by a chamber base surface, one or more peripheral side walls, and the side plate portion interior surface. The chamber base surface and the side plate portion interior surface are spaced apart from one another and the one or more peripheral side walls extend between the chamber base surface and the side plate portion interior surface. The plurality of posts extend between the chamber base surface and the side plate portion interior surface. The side plate portion, the side body housing portion, and the plurality of posts are integrally formed with one another.

According to another aspect of the present disclosure, a method for producing a rotary engine side housing is provided. The method includes using an additive manufacturing process to produce a side housing that includes a side plate portion, a side housing body portion, a coolant chamber, and a plurality of posts. The side plate portion has an exterior surface and an interior surface. The coolant chamber is disposed internally within the side housing body portion. The coolant chamber is defined by a chamber base surface, one or more peripheral side walls, and the side plate portion interior surface. The chamber base surface and the side plate portion interior surface are spaced apart from one another and the one or more peripheral side walls extend between the chamber base surface and the side plate portion interior surface. The plurality of posts extend between the chamber base surface and the side plate portion interior surface. The side plate portion, the side body housing portion, and the plurality of posts are integrally formed with one another.

It should be understood that any or all of the features or embodiments described herein can be used or combined in any combination with each and every other feature or embodiment described herein unless expressly noted otherwise.

The present disclosure, and all its aspects, embodiments and advantages associated therewith will become more readily apparent in view of the detailed description provided below, including the accompanying drawings.

DETAILED DESCRIPTION

Figure 1:
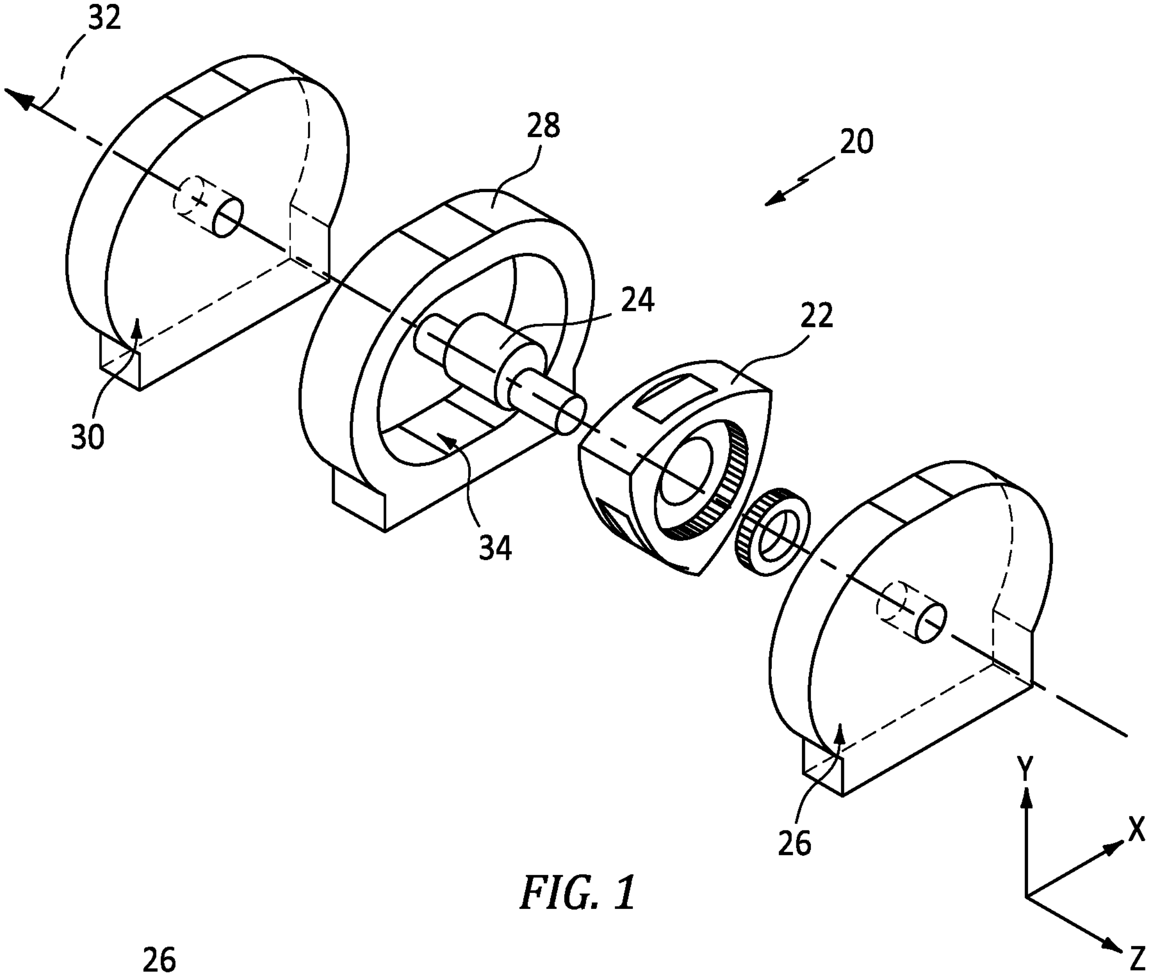
FIG. 1 is a diagrammatic exploded view of a rotary engine.

FIG. 1 shows a diagrammatic exploded view of a rotary engine 20 showing a rotor 22, a rotor shaft 24, a front side housing 26, an intermediate housing 28, and a rear side housing 30. The intermediate housing 28 is disposed between the front side housing 26 and the rear side housing 30. The engine 20 may be described as having a rotational axis 32 (extending along a Z-axis), a lateral width (extending along an X-axis), and a height (extending along a Y-axis). The rotor 22 is disposed within an inner chamber 34 collectively defined by the front side housing 26, intermediate housing 28, and rear side housing 30. More specifically, in assembled form the inner chamber 34 is defined by an axially extending trochoidal surface of the intermediate housing 28, a side plate portion of the front side housing 26, and a side plate portion of the rear side housing 30.

Figure 2:
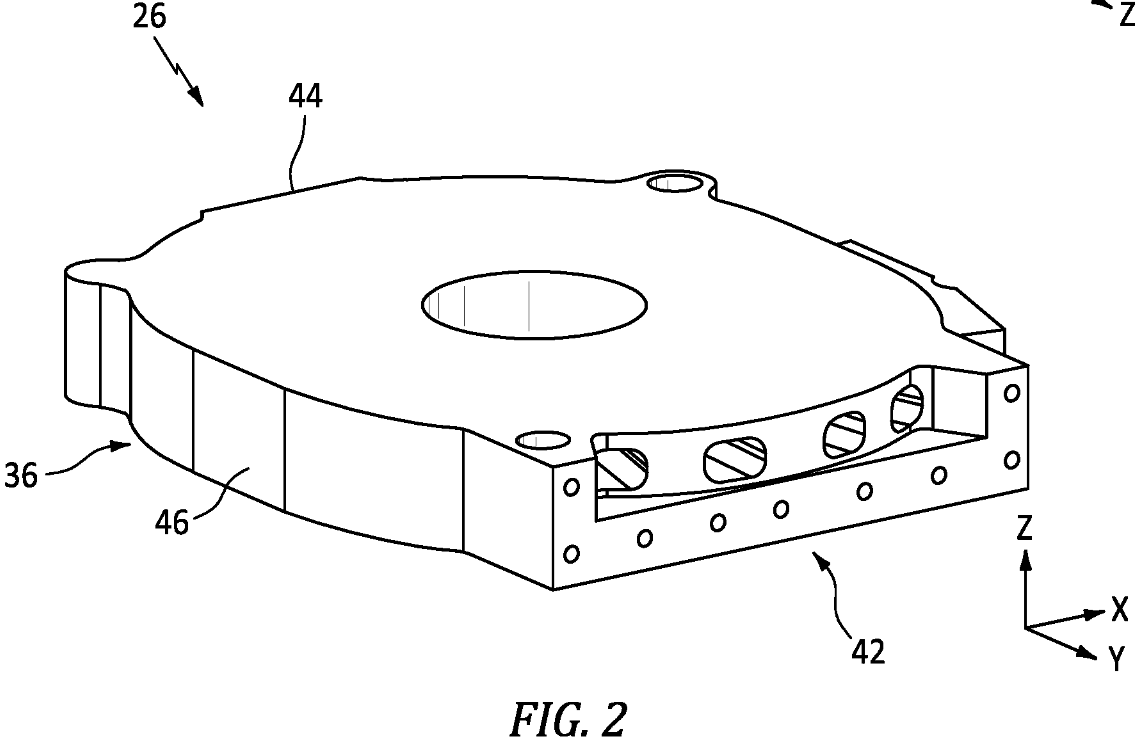
FIG. 2 is a diagrammatic perspective view of a rotary engine forward side housing.
Figure 3:
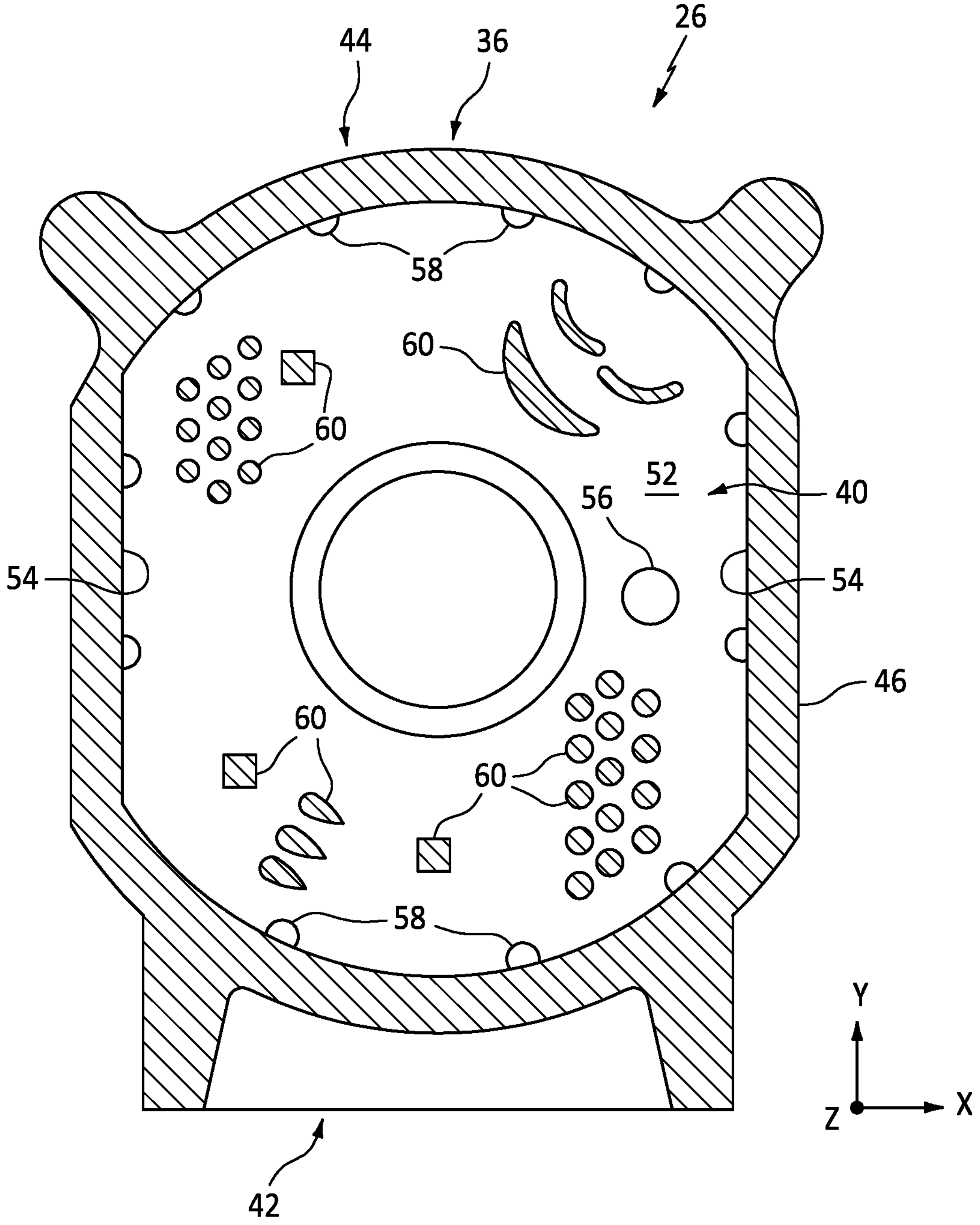
FIG. 3 is a diagrammatic sectional view of a forward side housing embodiment.

FIG. 2 shows a present disclosure front side housing 26. The present disclosure is equally applicable to the front side housing 26, the intermediate housing 28, or the rear side housing 30. To facilitate the description herein, the present disclosure will be detailed in terms of the front side housing 26, but to be clear the present disclosure is applicable to either the front or the rear side housing 26, 30, or the intermediate housing 28.

FIGS. 2-5 are diagrammatic views of a front side housing 26. The front side housing 26 includes a front side housing body 36, a side plate portion 38 (see FIG. 5), a coolant chamber 40, a base end 42, and a top end 44. The front side housing body 26 has an outer surface 46. The side plate portion 38 includes an interior surface 48 and an exterior surface 50. The side plate portion 38 is integrally formed with the front side housing body 36.

Figure 4:
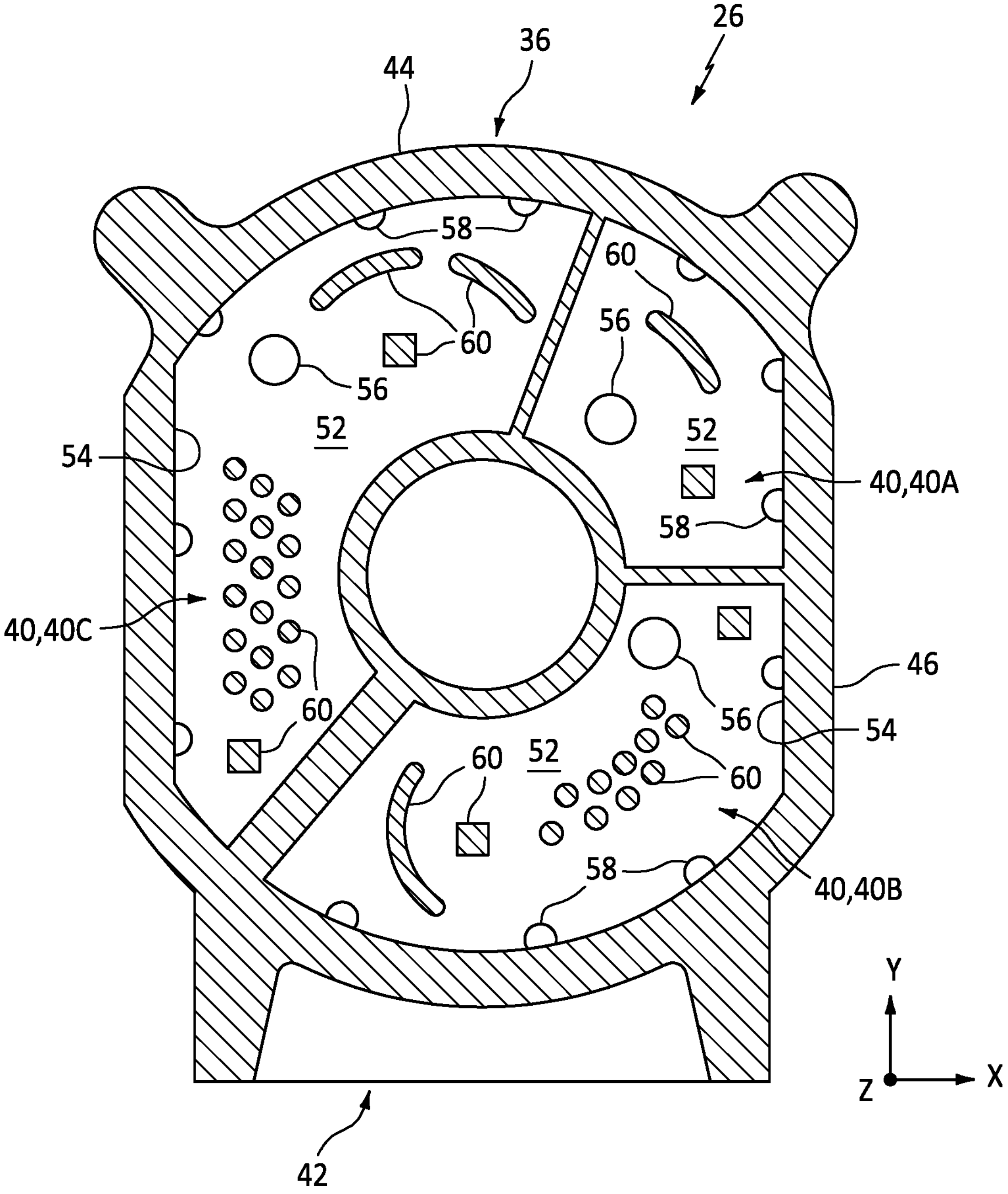
FIG. 4 is a diagrammatic sectional view of a forward side housing embodiment.
Figure 5:
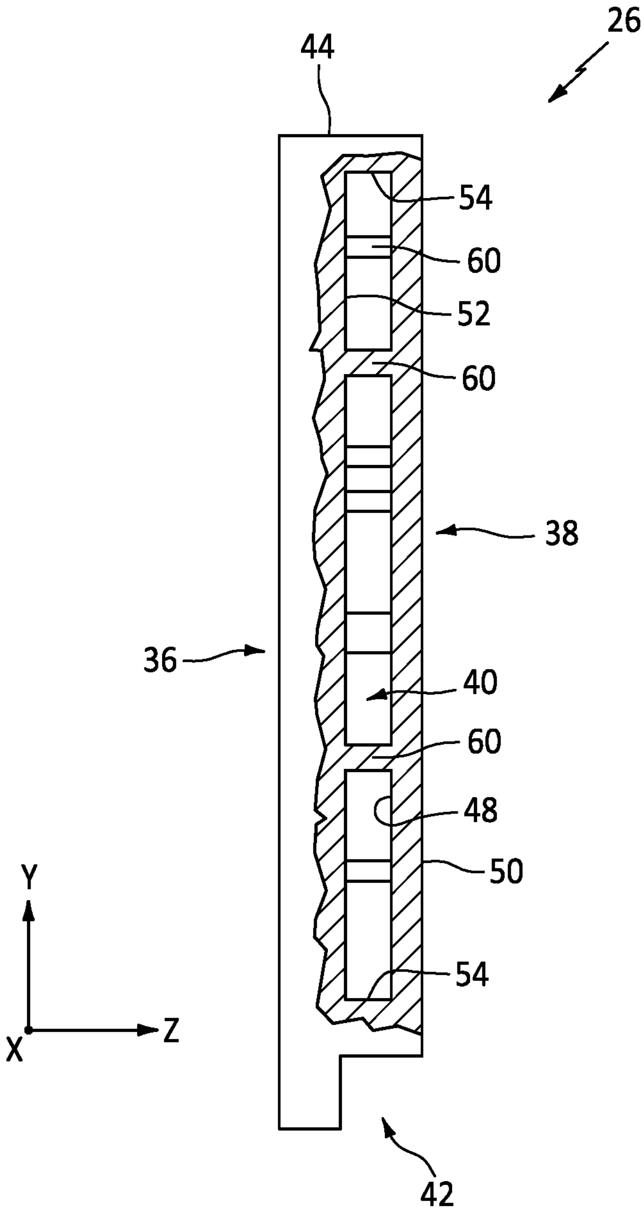
FIG. 5 is a diagrammatic partial sectional view of a forward side housing embodiment.

The coolant chamber 40 is an internal chamber and is defined by a chamber base surface 52, one or more peripheral side walls 54, and the interior surface 48 of the side plate portion 38. The embodiment shown in FIG. 3 includes a single coolant chamber 40 with no sub-chambers. The embodiment shown in FIG. 4 shows a coolant chamber 40 that includes sub-chambers 40A, 40B, 40C. The sub-chambers 40A, 40B, 40C collectively define the coolant chamber 40. The chamber base surface 52 and the interior surface 48 of the side plate portion 38 are spaced apart from one another and may extend generally parallel to one another. The one or more peripheral side walls 54 extend between chamber base surface 52 and the interior surface 48 of the side plate portion 38. The coolant chamber 40 may, therefore, be described as being contiguous with the side plate portion 38. At least one fluid inlet passage 56 and at least one fluid exit passage 58 are in communication with the coolant chamber 40 to permit coolant flow into and out of the coolant chamber 40.

A plurality of post-like structures (referred to hereinafter as "posts 60") are disposed within the coolant chamber 40, extending between the chamber base surface 52 and the interior surface 48 of the side plate portion 38. Some of these posts 60 extend entirely between the chamber base surface 52 and the interior surface 48 of the side plate portion 38 and are integrally formed with the front side housing body 36 and the side plate portion 38. Some posts 60 may extend outwardly from the chamber base surface 52 towards the interior surface 48 of the side plate portion 38 but are not connected with the side plate portion 38. Conversely, some posts 60 may extend outwardly from the side plate portion 38 towards the chamber base surface 52 but are not connected with the chamber base surface 52.

The posts 60 each have a cross-sectional geometry and different posts 60 may have different cross-sectional geometries. The cross-sectional geometry of a post 60 may be constant between the chamber base surface 52 and the interior surface 48 of the side plate portion 38 (e.g., the same cylindrical cross-section) or they may vary (e.g., a post cross-sectional geometry that tapers—increases or decreases in cross-sectional—between the chamber base surface 52 and the interior surface 48 of the side plate portion 38). The cross-sectional geometry of a post 60 may change from a first cross-sectional shape to a second cross-sectional shape; e.g., transition from a cylindrical cross-section to a non-cylindrical cross-section. Particular post 60 cross-sectional geometries may be adopted for one or more different functional purposes; e.g., as a heat transfer surface, as a flow directing surface, as a structural member, and the like. Non-limiting examples of cross-sectional geometries include circular, ovular, ovoid, conical, teardrop, triangular, diamond, trapezoidal, square, rectangular, squircle, trochoidal, polygonal, and the like. In some embodiments, the posts 60 may be collectively arranged to define coolant passages within the coolant chamber 40; e.g., passages that direct coolant flow in a circumferential direction, or in a lateral widthwise direction (X-axis), or in a heightwise direction (Y-axis) and so on.

The posts 60 are shown extending between the chamber base surface 52 and the interior surface 48 of the side plate portion 38 in a direction generally perpendicular thereto (i.e., along the Z-axis), but that is not required. In some embodiments, all or a portion of a post 60 may be disposed along a line that is skewed (i.e., non-perpendicular) to the chamber base surface 52 and/or the interior surface 48 of the side plate portion 38. The present disclosure is not limited to any particular post 60 interspacing pattern or arrangement.

The post 60 interspacing pattern may be symmetrical or non-symmetrical. The number (or collective cross-sectional area) of posts 60 in a first region may be greater than that in a second region.

Figure 6A:
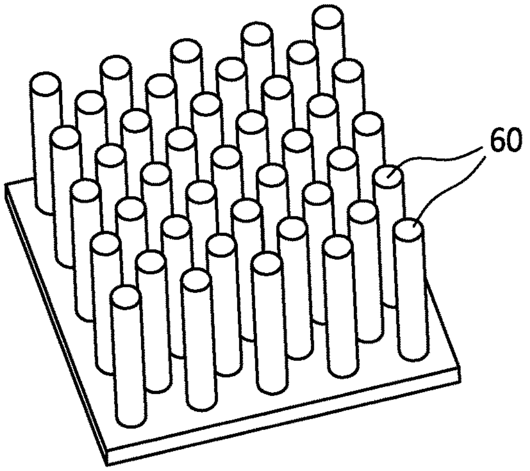
FIGS. 6A-6C are diagrammatic representations of post embodiments.
Figure 6B:
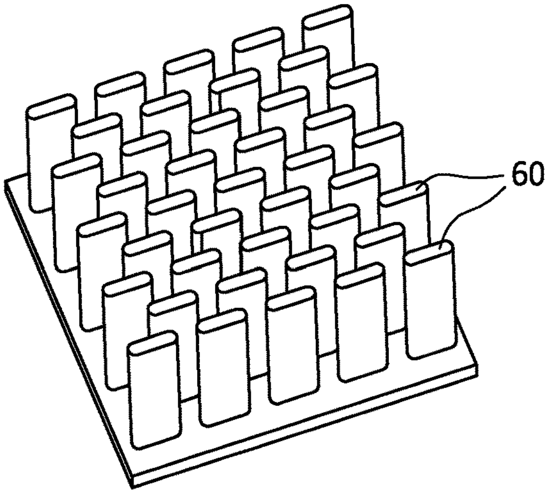
Figure 6C:
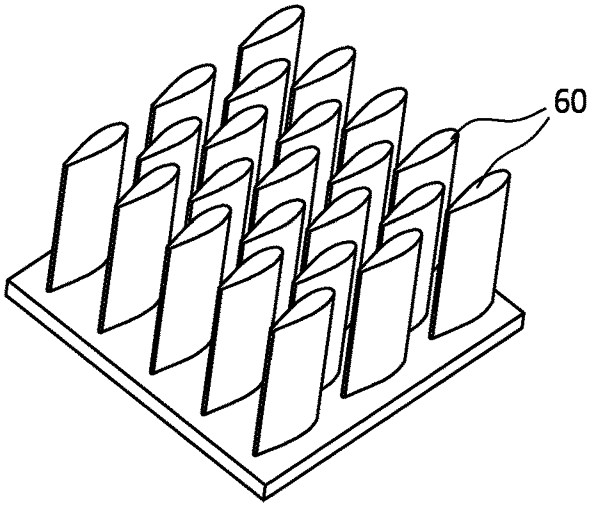
Figure 7:
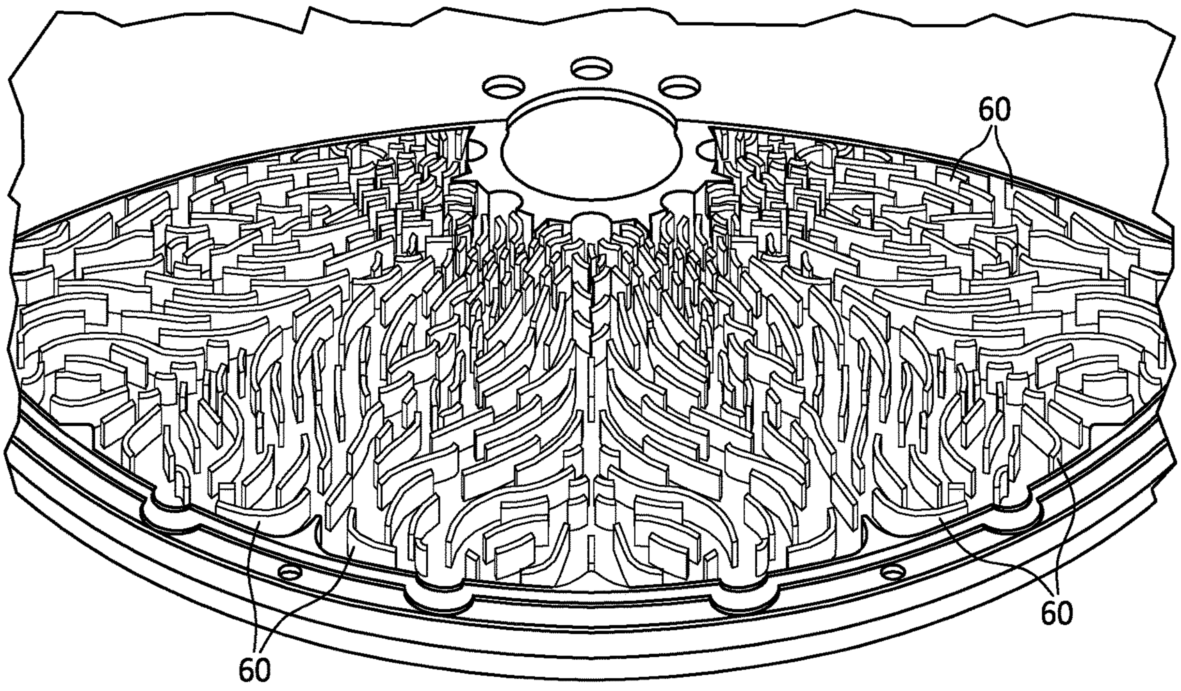
FIG. 7 is a diagrammatic representation of a side housing having a variety of post embodiments.

FIGS. 6A-C and 7 illustrate examples of posts 60 extending between the chamber base surface 52 and the interior surface 48 of the side plate portion 38. One of the chamber base surface 52 or the interior surface 48 of the side plate portion 38 is removed in FIGS. 6A-C and 7 to facilitate the description herein. In the examples shown in FIGS. 6A-6C, the posts 60 may have a length over diameter (L/D) in the range of 0.25 to 25. Posts 60 having an L/D in the aforesaid range may be referred to as a "microfin". FIG. 6A illustrates posts 60 having a cylindrical cross-sectional geometry. FIG. 6B illustrates posts 60 having an oblong cross-sectional geometry. FIG. 6C illustrates posts 60 having a teardrop or airfoil cross-sectional geometry. The post 60 cross-sectional post geometries shown in FIGS. 6A-6C are non-limiting examples. In some embodiments, the present disclosure may include posts 60 like those shown in FIGS. 6A-6C with a uniform post density (i.e., number of posts 60 per unit area) throughout the coolant chamber 40. In this manner, a significant amount of heat transfer surface is provided, and the integral posts 60 extending between the chamber base surface 52 and the interior surface 48 of the side plate portion 38 provide the side housing 26 (and in particular the side plate portion 38) with considerable stiffness. In some embodiments, one or more regions within the coolant chamber 40 may include posts 60 like those shown in FIGS. 6A-6C with a particular density of posts 60 per unit area but not all regions within the coolant chamber 40 may have the same aforesaid density of posts 60 per unit area. The embodiment shown in FIG. 7 also shows a high density of posts 60 per unit area but includes different posts 60 having different cross-sectional geometries; e.g., first posts 60 having a first cross-sectional geometry, second posts 60 having a second cross-sectional geometry, and so on. In this embodiment, the different post 60 cross-sectional geometries can be coordinated with one another to produce desirable coolant flow paths in a radial direction, or a circumferential direction, or any combination thereof.

The front side housing 26 is a unitary structure that may be homogeneous in material but is not required to be homogenous. The front side housing 26 may be produced, for example, using an additive manufacturing technique. The present disclosure housing is not, however, limited to a side housing being produced by an additive manufacturing process. For those embodiments wherein the side housing is produced using an additive manufacturing process, the front side housing 26 may be produced layer by layer from powder material. A laser or another suitable heat source (e.g., electron beam, heated thermal print head) is used to fuse the powder material in each layer (e.g., by melting the powder material). The powder deposition and fusing process is repeated for each layer of the component until the component is complete. In those embodiments wherein the front side housing 26 is a unitary structure that is materially homogeneous, each deposition layer may include the same material powder. In those embodiments wherein the front side housing 26 is a unitary structure that is not materially homogeneous, different deposition layers may include different material powders. For example, the deposition layers that form at least a portion of the side plate portion 38 may include a material that has desirable wear-resistance properties. Non-limiting examples of additive manufacturing techniques that may be used include direct metal laser sintering (DMLS), electron beam melting (EBM), selective heat sintering (SHS), selective laser melting (SLM) and selective laser sintering (SLS).

The unitary structure of the present disclosure side housing 26, 30 improves upon many shortcomings of existing rotary engine side housing configurations. Conventional rotary engine side housings typically include an independent side plate that is mechanically attached to a body of the side housing. Conventional side housing bodies may be produced in a casting process or from a solid body of material (e.g., a billet), and the cooling chamber is machined therein. The separate side plate is necessary to enclose the coolant chamber 40 formed in a conventional side housing body. In a conventional design, a seal is required between the side plate and the side housing body to make the cooling chamber fluid tight. The engine rotor 22 is contiguous with the exterior surface of the side plate and a seal is disposed therebetween to facilitate combustion chamber sealing during operation of the engine 20. The exterior surface of the side plate provides the rotor sealing surface. Hence, the side plate is subjected to a high temperature thermal environment by virtue of fuel/air mixture combustion within the combustion chamber and substantial mechanical loading by virtue of fuel/air compression and subsequent ignition within the combustion chamber. Conventional side plates are typically made of an aluminum alloy which may be a different material than that used to form the side housing body. Aluminum alloys are often used because they are lightweight and possess high thermal conductivity for cooling purposes. These same aluminum alloys, however, often possess other mechanical properties (e.g., coefficient of thermal expansion, Young's modulus, and the like) that are less desirable. The lack of mechanical strength typically associated with an aluminum alloy can produce side plate flatness deviation (which negatively affects sealing with the rotor 22) and potential fluid leakage between the side plate and the side housing body. The present disclosure resolves or at least mitigates these shortcomings in a variety of different ways. For example, the integrally formed nature of the present disclosure side housing eliminates the need for a fluid seal between an independent side plate and the side housing body. There is no need for a seal because the side plate portion 38 is integrally formed with the side housing body, and the potential for fluid leakage is eliminated. As another example, in a conventional side housing posts disposed in the cooling chamber are typically cantilevered structures that may be used to mechanically support the independent side plate but are not attached to the side plate (the side plate is independent). Consequently, the side plate may move relative to the unattached posts 60 during operation of the engine 20. The relative movement may negatively affect the mechanical strength of the structure (e.g., flatness of the side plate) during engine 20 operation and can lead to oil leakage. As stated above, a side plate that deviates from flatness can negatively affect the sealing between the side plate and the rotor 22. The integrally formed posts 60 of the present disclosure that extend between the chamber base surface 52 and the interior surface 48 of the side plate portion 38 provide desirable rigidity/stiffness to the structure that is understood to enhance the sealing between the side plate exterior/sealing surface and the rotor 22. The integral nature of the present disclosure side housing 26, 30 also permits enhanced side housing material options. For example, an additively manufactured side housing may be produced from a material that is beneficial in terms of heat transfer and mechanical strength. In contrast, a conventional side housing may be limited to certain materials for the side housing body and certain materials for the independent side plate.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection or likewise an attachment may be a direct attachment or indirect attachment. An indirect connection (or attachment) may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A rotary engine side housing, comprising:

a side plate portion having an exterior surface and an interior surface;

a side housing body portion having a chamber base surface, and a peripheral side wall that extends around a periphery of the side housing body portion;

wherein the side plate portion and the chamber base surface are in communication with the peripheral side wall around the periphery of the side housing body portion; and wherein the chamber base surface and the interior surface of the side plate portion are spaced apart from one another, and the peripheral side wall extends between the chamber base surface and the interior surface of the side plate portion;

a coolant chamber defined by the chamber base surface, the peripheral side wall, and the interior surface of the side plate portion; and a plurality of posts extending between the chamber base surface and the interior surface of the side plate portion;

wherein the side plate portion, the side body housing portion, and the plurality of posts are integrally formed with one another.

2. The side housing of claim 1, wherein the plurality of posts includes a first group of said posts that extend entirely between the chamber base surface and the interior surface of the side plate portion and are integrally connected to both the chamber base surface and the side plate portion interior surface.

3. The side housing of claim 1, wherein the plurality of posts includes at least one said post that is integrally connected to the chamber base surface and extends outwardly toward the interior surface of the side plate portion.

4. The side housing of claim 1, wherein the plurality of posts includes at least one said post that is integrally connected to the interior surface of the side plate portion and extends outwardly toward the chamber base surface.

5. The side housing of claim 1, wherein the plurality of posts includes a first post having a first cross-sectional geometry and a second post having a second cross-sectional geometry, and the second cross-sectional geometry is different from the first cross-sectional geometry.

6. The side housing of claim 1, wherein the plurality of posts includes at least one said post having a constant cross-sectional geometry in a direction between the chamber base surface and the interior surface of the side plate portion.

7. The side housing of claim 1, wherein the plurality of posts includes at least one said post having a non-constant cross-sectional geometry in a direction between the chamber base surface and the interior surface of the side plate portion.

8. The side housing of claim 1, wherein the plurality of posts each have a length over diameter (L/D) between 0.25 to 25.

9. The side housing of claim 1, wherein the plurality of posts includes at least one said post having a cross-sectional geometry configured to direct fluid flow within the coolant chamber.

10. The side housing of claim 1, wherein the side plate portion, the side housing body portion, and the plurality of posts comprise the same material.

11. The side housing of claim 1, wherein the side housing is configured as a front side housing.

12. A rotary engine, comprising:

an intermediate housing; and a pair of side housings, wherein each said side housing includes:

a side plate portion having an exterior surface and an interior surface;

a side housing body portion having a chamber base surface, and a peripheral side wall that extends around a periphery of the side housing body portion;

wherein the side plate portion and the chamber base surface are in communication with the peripheral side wall around the periphery of the side housing body portion; and wherein the chamber base surface and the interior surface of the side plate portion are spaced apart from one another, and the peripheral side wall extends between the chamber base surface and the interior surface of the side plate portion;

a coolant chamber defined by the chamber base surface, the peripheral side wall, and the interior surface of the side plate portion; and a plurality of posts extending between the chamber base surface and the interior surface of the side plate portion;

wherein the side plate portion, the side body housing portion, and the plurality of posts are integrally formed with one another;

wherein the intermediate housing is disposed between and attached to the pair of side housings.

13. The rotary engine of claim 12, wherein the plurality of posts includes a first group of said posts that extend entirely between the chamber base surface and the interior surface of the side plate portion and are integrally connected to both the chamber base surface and the interior surface of the side plate portion.

14. The rotary engine of claim 12, wherein the plurality of posts includes at least one said post that is integrally connected to the chamber base surface and extends outwardly toward the interior surface of the side plate portion.

15. The rotary engine of claim 12, wherein the plurality of posts includes at least one said post that is integrally connected to the interior surface of the side plate portion and extends outwardly toward the chamber base surface.

16. The rotary engine of claim 12, wherein the plurality of posts includes a first post having a first cross-sectional geometry and a second post having a second cross-sectional geometry, and the second cross-sectional geometry is different from the first cross-sectional geometry.

17. The rotary engine of claim 12, wherein the plurality of posts includes at least one said post having a constant cross-sectional geometry in a direction between the chamber base surface and the side plate portion interior surface.

18. The rotary engine of claim 12, wherein the plurality of posts each have a length over diameter (L/D) between 0.25 to 25.

19. A method for producing a rotary engine side housing, comprising:

using an additive manufacturing process to produce a side housing that includes:

a side plate portion having an exterior surface and an interior surface;

a side housing body portion having a chamber base surface, and a peripheral side wall that extends around a periphery of the side housing body portion;

wherein the side plate portion and the chamber base surface are in communication with the peripheral side wall around the periphery of the side housing body portion; and wherein the chamber base surface and the interior surface of the side plate portion are spaced apart from one another, and the peripheral side wall extends between the chamber base surface and the interior surface of the side plate portion;

a coolant chamber defined by the chamber base surface, the peripheral side wall, and the interior surface of the side plate portion; and a plurality of posts extending between the chamber base surface and the interior surface of the side plate portion interior surface;

wherein the side plate portion, the side body housing portion, and the plurality of posts are integrally formed with one another.

20. The method of claim 19, wherein the plurality of posts includes a first group of said posts that extend entirely between the chamber base surface and the interior surface of the side plate portion and are integrally connected to both the chamber base surface and the interior surface of the side plate portion.

* * * * *